(12) United States Patent
Makino et al.

(10) Patent No.: US 6,390,545 B1
(45) Date of Patent: May 21, 2002

(54) SUN ROOF DEVICE

(75) Inventors: Hiroshi Makino, Nagoya; Takashi Kitani, Kariya; Youji Nagashima, Toyota; Kenji Maeta, Kariya, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/714,959

(22) Filed: Nov. 20, 2000

(30) Foreign Application Priority Data

Nov. 19, 1999 (JP) ............................................. 11-330455

(51) Int. Cl.$^7$ .................................................. B60J 7/05
(52) U.S. Cl. ........................ 296/223; 296/221; 296/224
(58) Field of Search ................................ 296/221, 222, 296/223, 224

(56) References Cited

U.S. PATENT DOCUMENTS

| | | | | |
|---|---|---|---|---|
| 4,332,416 A | * | 6/1982 | Lutz et al. ............... | 296/221 X |
| 4,647,104 A | * | 3/1987 | Kohlpainter et al. ........ | 296/221 |
| 5,066,068 A | * | 11/1991 | Suzuki et al. ............... | 296/221 |
| 5,085,622 A | * | 2/1992 | Kohlpaintner et al. ...... | 296/222 |
| 5,580,123 A | | 12/1996 | Ochiai ........................ | 296/223 |
| 5,593,204 A | * | 1/1997 | Wahl et al. .................. | 296/223 |
| 6,164,718 A | * | 12/2000 | Stallfort ................... | 296/221 X |
| 6,257,658 B1 | * | 7/2001 | Nabuurs et al. ............ | 296/223 |

* cited by examiner

Primary Examiner—Dennis H. Pedder
(74) Attorney, Agent, or Firm—Burns, Doane, Swecker & Mathis, LLP

(57) ABSTRACT

A vehicle sun-roof device includes a movable panel for fully covering and uncovering an opening in the vehicle roof, a guide rail provided along a side of the opening in the vehicle longitudinal direction, and a link mechanism associated with the movable panel for tilting the movable panel. The link mechanism includes a bracket supporting the movable panel, a link member for restricting the rotational position of the bracket, a drive shoe slidably disposed in the guide rail and associated with the bracket via the link member, and a driven shoe slidably disposed in the guide rail and rotatably supporting one end of the bracket. A checking mechanism restricts the movement of the driven shoe in the vehicle longitudinal direction and includes a restriction portion formed at the bracket and a guide block fixed to the guide rail. When the rotational position of the bracket is within a range between a first rotational position at which the opening is fully covered by the movable panel and a second rotational position at which the movable panel is tilted at a maximum angle, the restriction portion and the guide block continue to be engaged in the vehicle longitudinal direction.

6 Claims, 10 Drawing Sheets

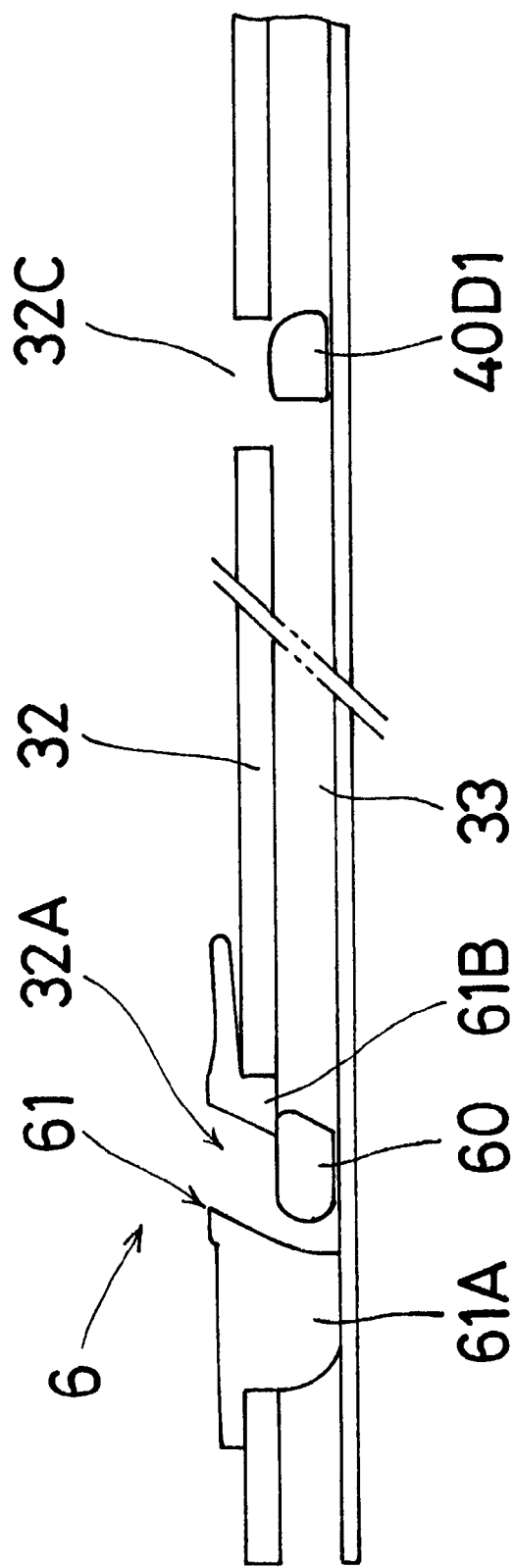

SUN ROOF DEVICE

This application is based on and claims priority under 35 U.S.C. § 119 with respect to Japanese Application No. 11(1999)-330455 filed on Nov. 19, 1999, the entire content of which is incorporated herein by reference.

FIELD OF THE INVENTION

This invention generally relates to a vehicle sun-roof device. More particularly, the present invention pertains to a movable panel for a vehicle sun-roof device provided with a link mechanism and a checking mechanism for at least tilting the movable panel.

BACKGROUND OF THE INVENTION

A known type of vehicle sun-roof device is provided with a link mechanism including a bracket for supporting a movable panel for fully covering and uncovering the opening of the vehicle roof, a link member disposed between the bracket and a guide rail for restricting the rotational position of the bracket, a drive shoe disposed in the guide rail and associated with the bracket via the link member for sliding within the guide rail by the push-pull of a cable, and a driven shoe provided in the guide rail and rotatably supporting one end of the bracket. The device further includes a checking mechanism including a checking block attached to the driven shoe, a checking pin formed integrally with the bracket, and a guide block fixed to the guide rail.

In this known construction, the checking block functions to restrict the movement of the movable panel in the vehicle longitudinal direction during the tilting operation of the movable panel and the checking pin functions to restrict the movement of the movable panel in the vehicle longitudinal direction at the fully covering position of the movable panel. These two components of the checking mechanism prevent the movable panel from moving in the vehicle longitudinal direction while the vehicle is running.

However, this known construction suffers from certain disadvantages and drawbacks. For example, in the checking mechanism the checking block is separately formed from the checking pin. This requires a greater number of parts and thus increases the complexity of the overall construction. Further, the checking pin and the block are formed in the vehicle longitudinal direction respectively and sufficient space in the vehicle longitudinal direction is needed, thus possibly limiting the design and construction of the device.

In addition, the checking block is attached to the driven shoe while the checking pin is formed on the bracket which is formed separately from the driven shoe for relative rotation. This may generate looseness between the bracket and the driven shoe. The driven shoe is basically designed not to be moved in the longitudinal direction during the tilting operation of the movable panel, but because the movable panel itself is attached to the bracket, looseness may be generated by the gap between the bracket and the driven shoe during the tilting operation of the movable panel. This may cause an undesirable noise to be generated during the tilting operation.

A need thus exists for an improved vehicle sun-roof device which is not as susceptible to the foregoing disadvantages and drawbacks.

A need also exists for a vehicle sun-roof device having a simple checking mechanism which is able to reduce the aforementioned looseness and any associated noise generated by such looseness.

SUMMARY OF THE INVENTION

According to an aspect of the present invention, a vehicle sun-roof device includes a movable panel for fully covering and uncovering an opening in the vehicle roof, a guide rail provided along a side of the opening in the vehicle longitudinal direction, and a link mechanism associated with the movable panel for tilting the movable panel. The link mechanism includes a bracket supporting the movable panel, a link member for restricting the rotational position of the bracket, a drive shoe slidably disposed in the guide rail and associated with the bracket via the link member, and a driven shoe slidably disposed in the guide rail and rotatably supporting one end of the bracket. A checking mechanism restricts the movement of the driven shoe in the vehicle longitudinal direction and includes a restriction portion formed at the bracket and a guide block fixed to the guide rail. When the rotational position of the bracket is within a range between a first rotational position at which the opening is fully covered by the movable panel and a second rotational position at which the movable panel is tilted at a maximum angle, the restriction portion and the guide block continue to be engaged in the vehicle longitudinal direction.

In accordance with the present invention, the restriction portion of the bracket is engaged with the guide block when the rotational position of the bracket is within the range between the first and second rotational positions, and the movement of the bracket in the vehicle longitudinal direction is restricted. This means that the restriction of the movement of the bracket in the longitudinal direction at both the fully covering of the opening of the roof and the tilting operation of the movable panel can be achieved by a single component (i.e., the restriction portion of the bracket). Accordingly, the present invention provides a simplified construction of the vehicle sun-roof device by reducing the number of components.

Also, the restriction of the movement of the bracket in the longitudinal direction is continuously made at both the fully covering position and the tilting operation of the movable panel and so substantially no looseness is generated which may otherwise occur when switching from the fully covering position to the tilting operation, or vice versa. This operational change can also be carried out smoothly.

In accordance with the present invention, the restriction portion is formed on the bracket and not on the driven shoe. The restriction of the movement of the movable panel in the vehicle longitudinal direction during the tilting operation will thus not generate any looseness on the movable panel, thus avoiding undesirable noise. In the vehicle sun-roof device, the tilting or tilting operation of the movable panel involves upwardly tilting the movable panel from the condition of fully covering the opening of the vehicle roof to the inclined position.

According to another aspect of the present invention, a vehicle sun-roof device includes a movable panel for covering and uncovering an opening in a roof of the vehicle, a guide rail provided along a side of the opening in the vehicle longitudinal direction, and a link mechanism operatively associated with the movable panel for moving the movable panel between a first position in which the movable panel fully covers the opening in the roof and a second position in which the movable panel is tilted upwardly, and between the first position and a third position in which the movable panel is moved to uncover the opening in the roof. The link mechanism includes a bracket supporting the movable panel, a link member disposed between the bracket and a drive shoe slidably disposed in the guide rail, and a slidable driven shoe rotatably supporting one end of the bracket. A checking mechanism restricts movement of the driven shoe in the vehicle longitudinal direction and includes a guide block fixed to the guide rail and a restriction portion provided on the bracket which engages the guide block when the movable panel moves from the first position to the second position and which becomes disengaged from the guide block when the movable panel moves from the first position to the third position

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAIL DESCRIPTION OF THE INVENTION

Figure 1:
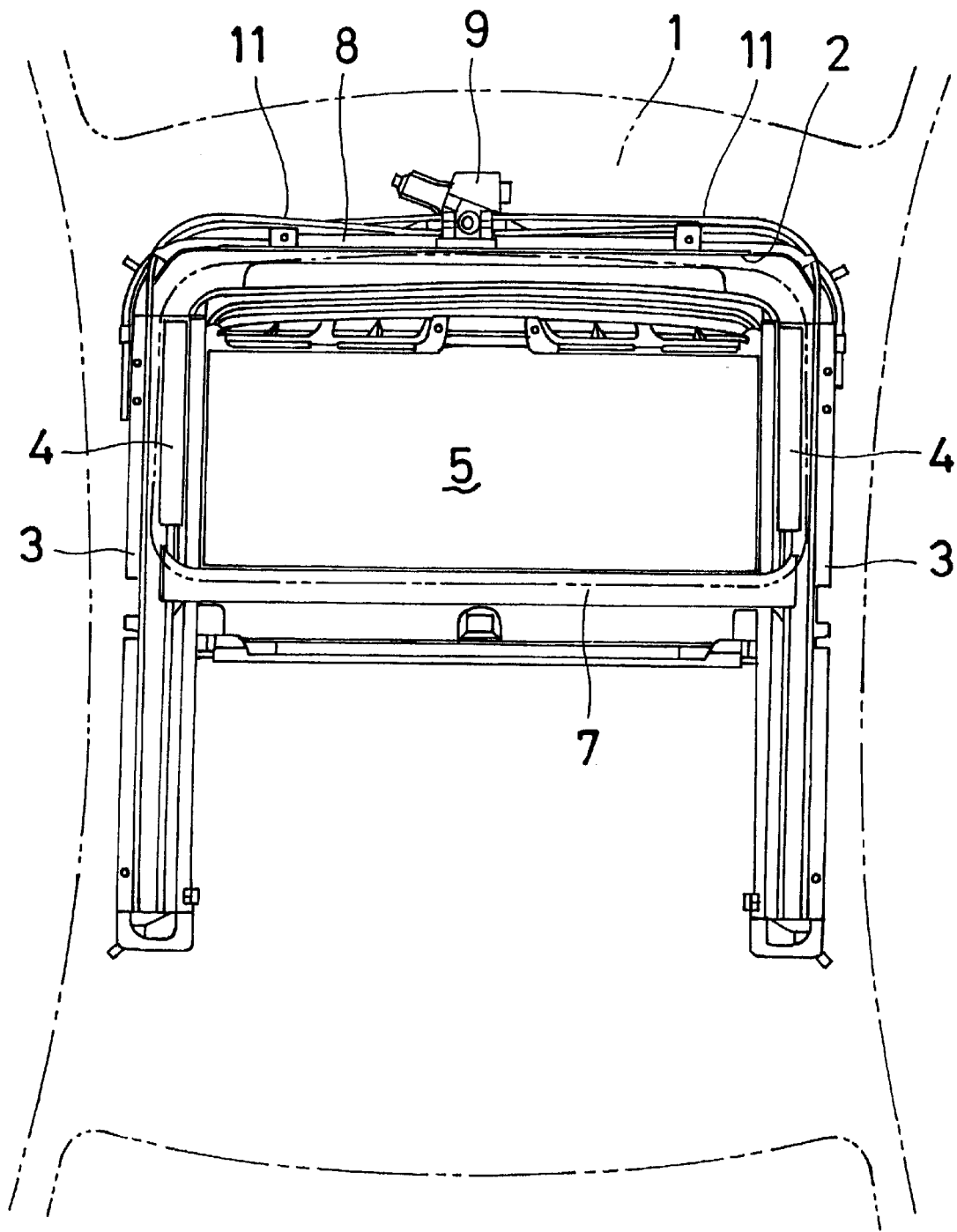
FIG. 1 is a top view of a vehicle installed with the vehicle sun-roof device of the present invention.
Figure 2:
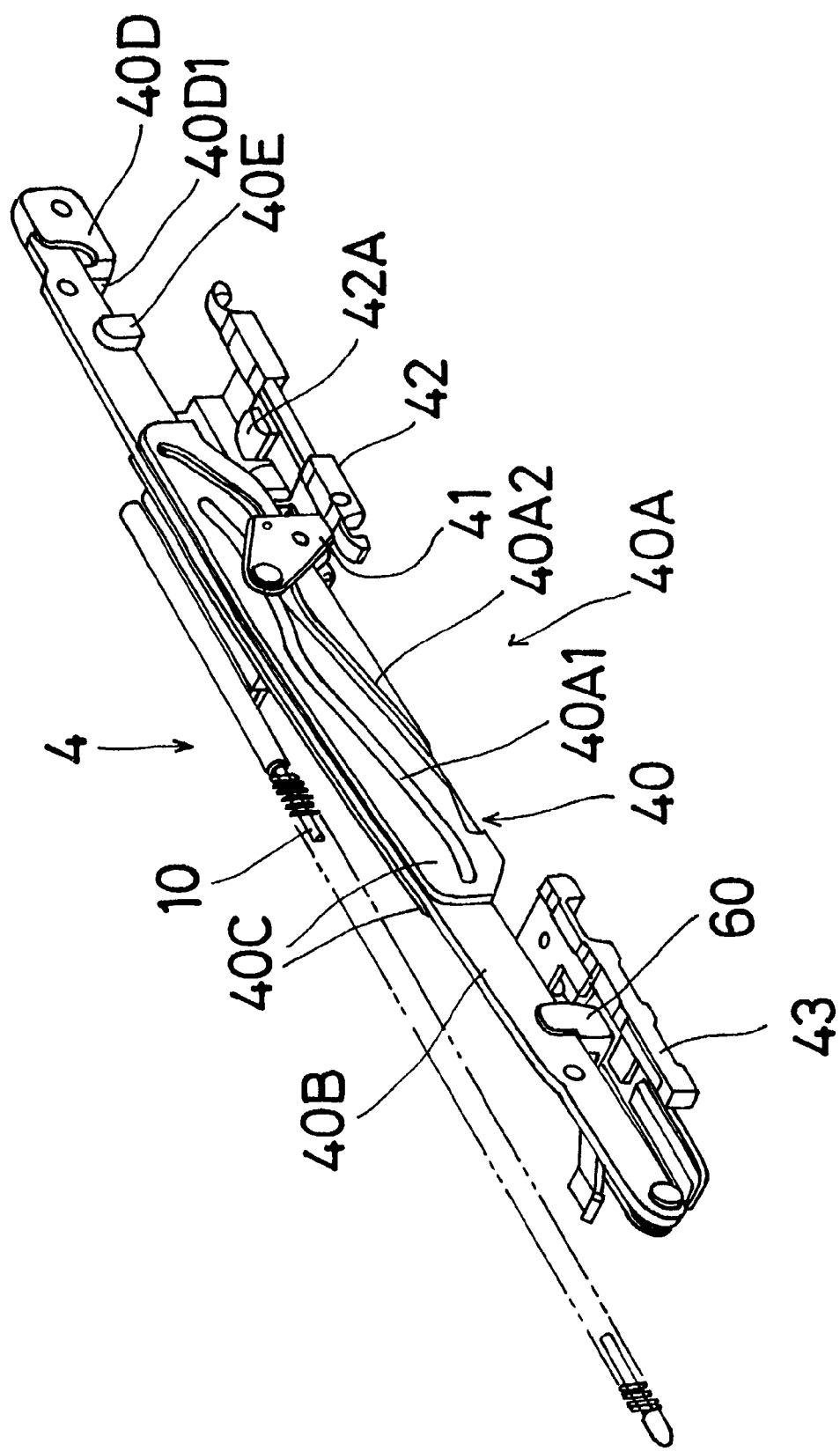
FIG. 2 is an enlarged perspective view of a link mechanism used in the vehicle sun-roof device of FIG. 1.
Figure 3:
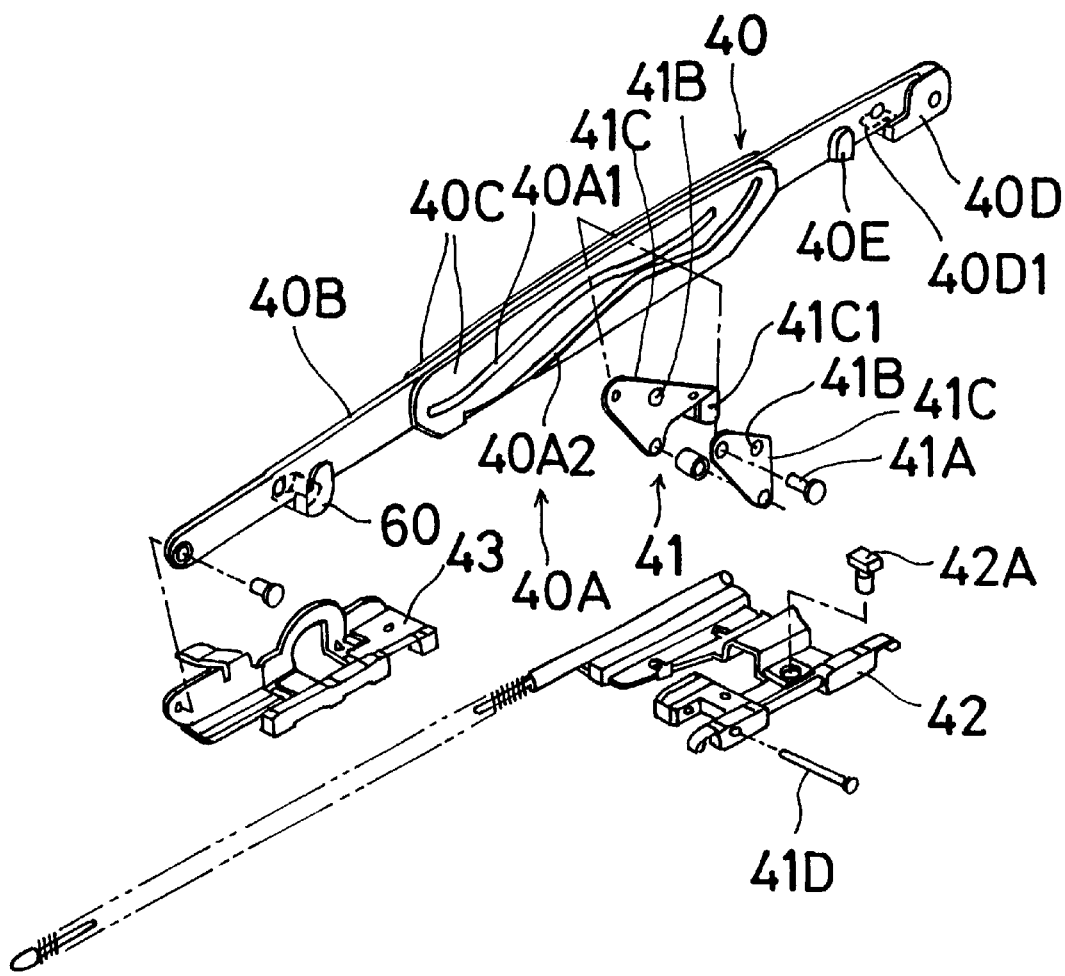
FIG. 3 is an exploded perspective view of the link mechanism shown in FIG. 2.

Referring initially to FIG. 1, the vehicle sun-roof device of the present invention includes a movable panel 5 for fully covering and uncovering an opening 2 in a vehicle roof 1, a pair of guide rails 3 formed integrally with a pair of corresponding gutters and provided along both sides of the opening 2 in the vehicle longitudinal direction (i.e., the up-down direction as viewed in FIG. 1), a rain channel 7 provided on the movable panel 5 in the lateral direction of the opening 2 to form a rain gutter, a link mechanism 4 associated with the movable panel 5 for effecting the sliding operation and the tilting operation of the movable panel 5 by the push-pull operation of a cable 10, and a checking mechanism 6 (shown in FIGS. 9 and 11) for restricting the movement of the link mechanism 4 in the vehicle longitudinal direction. The movable panel 5 is supported by the pair of guide rails 3 via the link mechanism 4 and is slidable in the vehicle longitudinal direction.

At the front end of the opening 2 (i.e., the upward side as viewed in FIG. 1) a front frame 8 is provided and the guide rails 3 are connected to the front frame 8 by a suitable connection mechanism such as tapping screws. A well known drive mechanism 9 is fixed to the front frame 8 and the drive mechanism 9 is engaged with the link mechanism 4 via the cable 10. The cable 10 is a well known geared type cable and is slidably guided in the guide rails 3 and pipes 11.

When the drive mechanism 9 is driven in one direction with the movable panel being in the fully covering position, the movable panel 5 slidably moves via the cable 10 and the link mechanism 4 in the vehicle longitudinal direction to uncover the opening 2 of the roof 1. When the drive mechanism 9 is driven in the other direction with the movable panel in the fully covering position, the movable panel 5 slidably moves upwardly from the roof 1 via the cable 10 and the link mechanism 4.

FIGS. 2–8 illustrate the various details associated with the link mechanism 4. As seen initially with reference to FIGS. 2 and 3, the link mechanism 4 includes a bracket 40 having a guide groove 40A for supporting the movable panel 5, a link member 41 provided between the guide rail 3 and the bracket 40 in the vehicle longitudinal direction along the opening 2 of the vehicle roof 1 for restricting the rotational position of the bracket 40 by being guided in the guide groove 40A, a drive shoe 42 slidably disposed in the guide rail 3 and associated with the bracket 40 via the link member 41, and a driven shoe 43 rotatably supporting one end of the bracket 40 and slidably provided in the guide rail 3. The drive shoe 42 is fixed to one end of the cable 10 and slides within the guide rail 3 by the push-pull operation of the cable 10.

Figure 4:
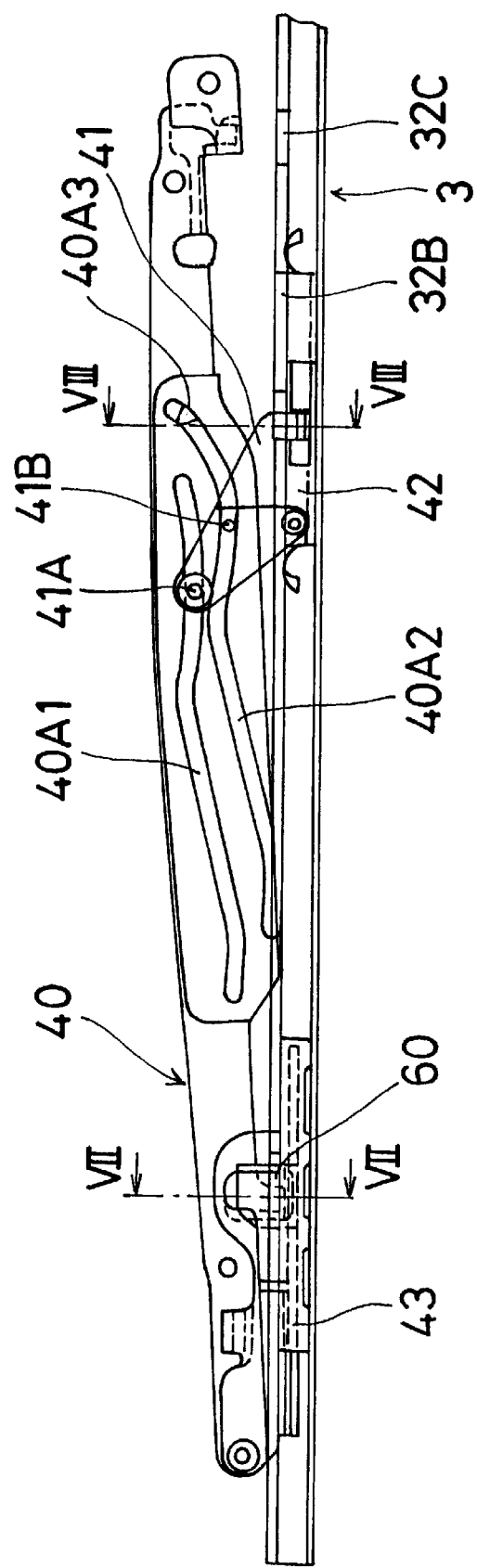
FIG. 4 is a side view of the link mechanism illustrated in FIG. 2 at a first rotational position of the bracket.
Figure 5:
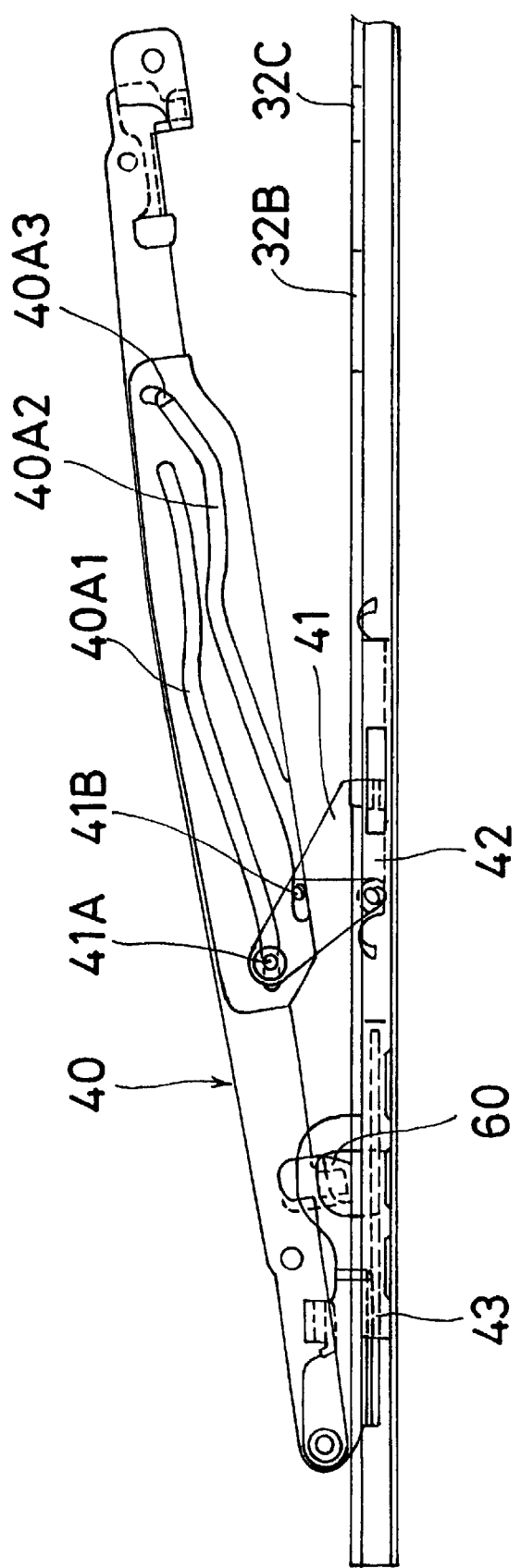
FIG. 5 is a side view of the link mechanism illustrated in FIG. 2 at a second rotational position of the bracket.
Figure 6:
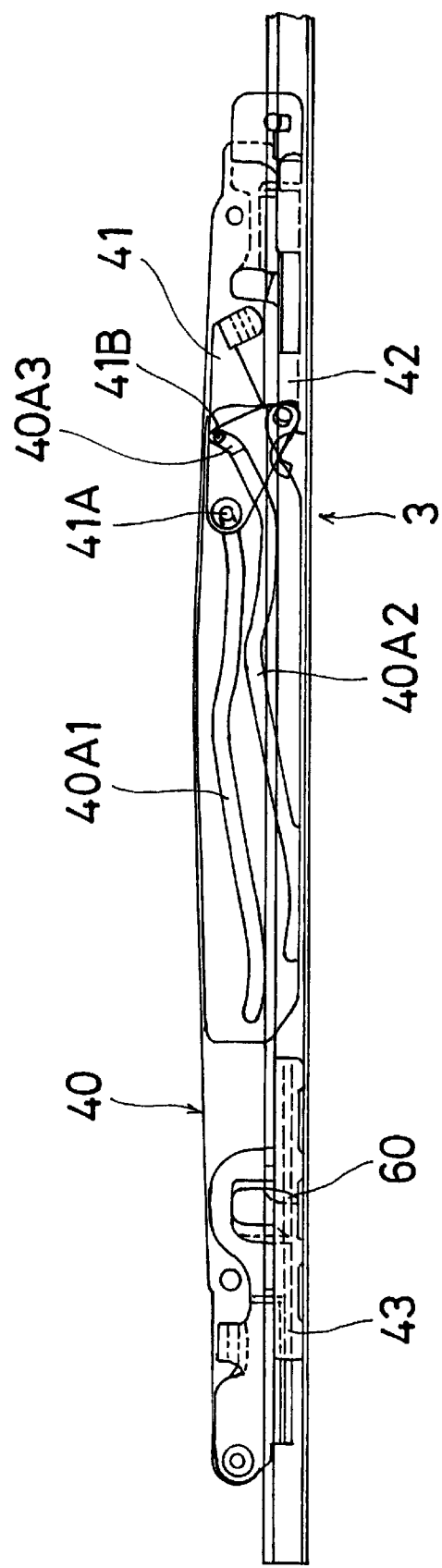
FIG. 6 is a side view of the link mechanism illustrated in FIG. 2 at a third rotational position of the bracket.

FIG. 4 depicts the link mechanism 4 when the bracket 40 is at a first rotational position associated with the movable panel 5 entirely covering the opening 2 of the roof 1. FIG. 5 shows the link mechanism 4 when the bracket 40 is at a second rotational position associated with the movable panel 5 being tilted at its maximum extent. FIG. 6 illustrates the link mechanism 4 when the bracket 40 and the driven shoe 43 are positioned such the bracket 40 is at a third rotational position associated with the movable panel 5 being slidably moved from the position fully covering the opening 2 of the roof 1 to the position entirely uncovering the opening 2.

Figure 7:
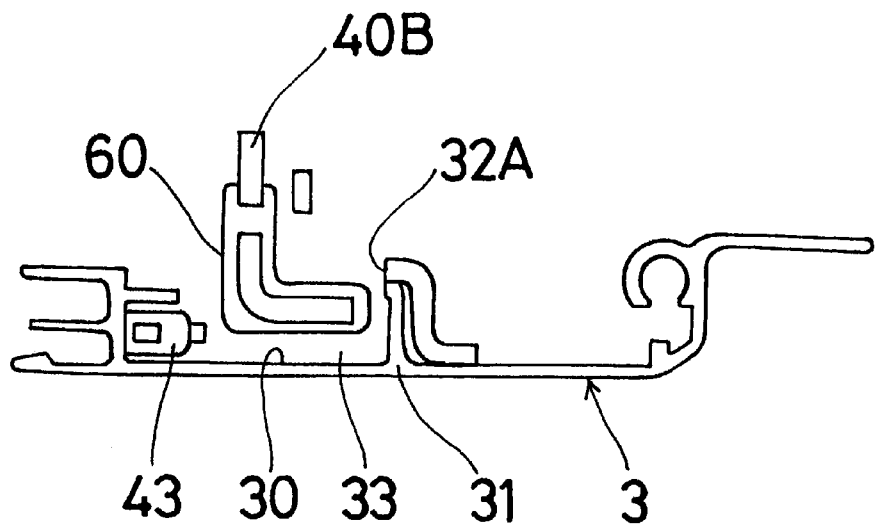
FIG. 7 is a cross-sectional view of the link mechanism taken along the section line VII–VII in FIG. 4.
Figure 8:
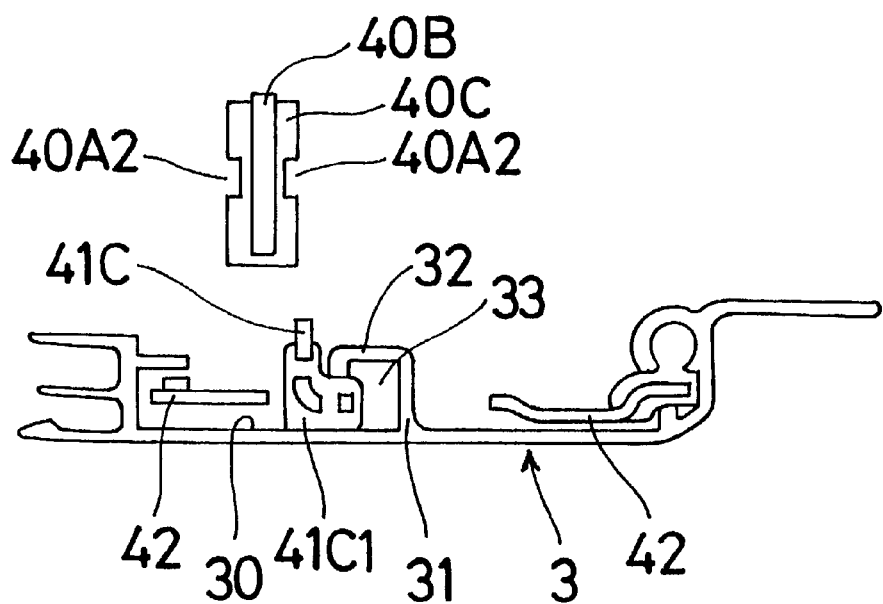
FIG. 8 is a cross-sectional view of the link mechanism taken along the section line VIII–VIII in FIG. 4.

As shown in FIGS. 7 and 8, the guide rail 3 includes a bottom portion 30 extending in the sliding direction of the drive and driven shoes 42, 43 (i.e., in the vehicle longitudinal direction), a side wall 31 formed in the vertical direction of the bottom portion 30 for restricting the movement of the drive and driven shoes 42, 43 in the vehicle lateral direction, and an extension wall 32 extending from the side wall 31 in parallel with the bottom portion 30 for restricting the movement of the drive and driven shoes 42, 43 in the vehicle vertical direction. The extension wall 32 possesses a plurality of rectangular recesses or openings 32A, 32B, and 32C as shown in FIGS. 4, 7 and 9–11. These components, including the bottom portion 30, the side wall 31, and the extension wall 32, form a rail groove 33 of the guide rail 3.

Explaining the components of the link mechanism 4, the bracket 40 includes a first plate 40B made of steel and rotatably engaged with the driven shoe 43 at one end, and a pair of second plates 40C made or resin and provided at both sides of the first plate 40B. The length of the second plates 40C is shorter than that of the first plates 40B.

The two second plates 40C are formed as one unit with the first plate 40B and are connected to each other at the lower end. A supporting portion 40D made of resin is integrally formed with the end of the first plate 40B opposite the end at which is provided the driven shoe 43. The supporting portion 40D supports the rain channel 7 for integral movement of the movable panel 5 and the rain channel 7.

The supporting portion 40D includes an extension 40D1 integrally formed and extending outwardly in the vehicle lateral direction. When the bracket 40 is moved from the condition or position shown in FIG. 4 to the condition or position shown in FIG. 7, the extension 40D1 is guided to the upper side of the guide rail 3 from the rail groove 33 via the recess 32C and when the bracket 40 is under the condition or position shown in FIG. 4 and FIG. 5, the extension 40D1 slides in the rail groove 33. A stopper 40E made of resin is provided near the supporting portion 40D for restricting the rotational position of the bracket 40 and the movable panel 5 slides with the stopper 40E being in contact with a damper 42A provided on the guide shoe 42.

The guide groove 40A of the bracket 40 includes a first guide groove 40A1 penetrating the first and second plates 40B, 40C and associated with the link member 41, and a second guide groove 40A2 provided in the second plates 40C (not penetrating the first plate 40B) and having a different guiding movement or different locus with respect to the first guide groove 40A1. Both the first guide groove 40A1 and the second guide groove 40A2 are designed to displace or change the rotational position of the bracket 40 by providing a guiding for the link member 41.

The link member 41 includes a penetrating pin 41A rotatably penetrating the first guide groove 40A1, a projection 41B accommodated in the second guide groove 40A2, and a pair of link plates 41C supporting the penetrating pin 41A from outside of the second plates 40C and slidable relative to the drive shoe 42.

The link member 41 engaged with the bracket 40 is engaged with the drive shoe 42 by a pin 41D. One of the link plates 41C includes a projection 41C1 made of resin that projects from the side of the bracket 40 in the lateral direction of the vehicle. The projection 41C1 is guided to the upper side of the guide rail 3 from the inside of the rail groove 33 via the recess 32B when the link mechanism 4 moves from the condition or position shown in FIG. 4 to the condition or position shown in FIG. 7 and slides in the rail groove 33 when the link mechanism 4 is positioned in the manner shown in FIGS. 4 and 5.

Figure 9:
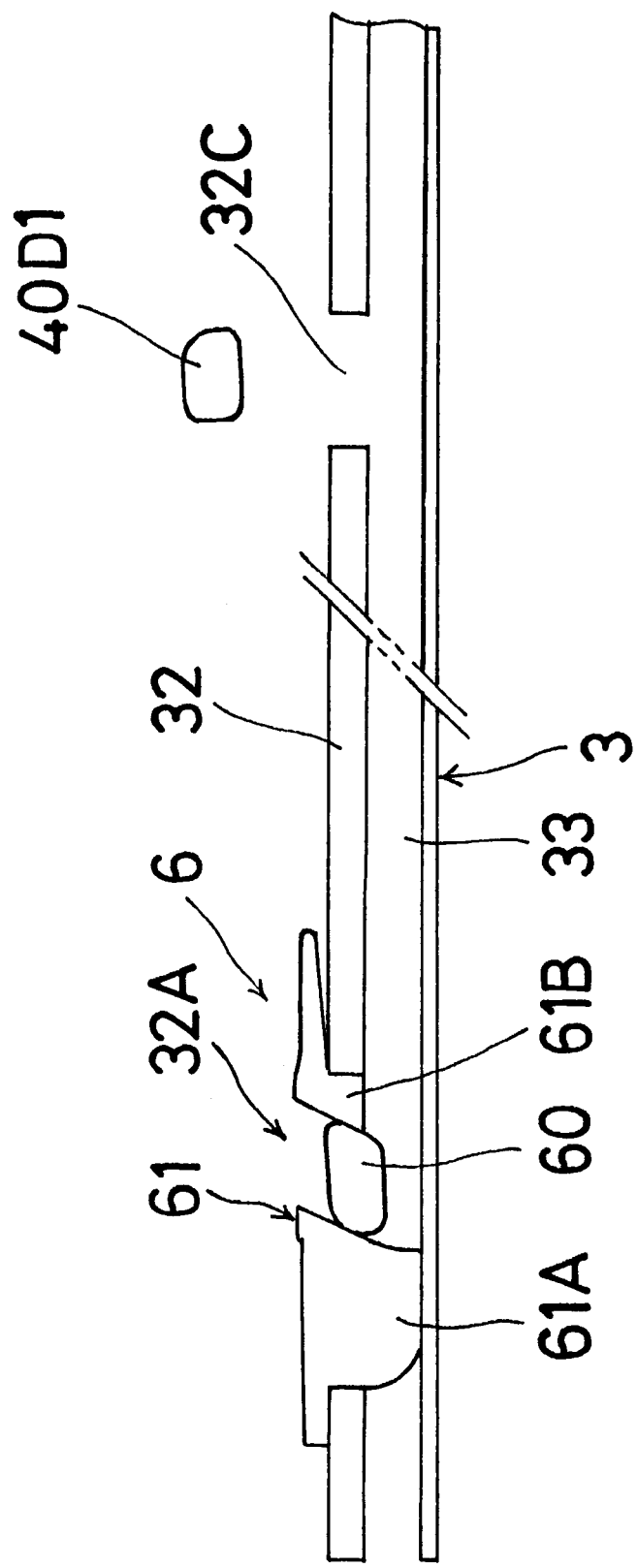
FIG. 9 is a side view of a portion of the link mechanism illustrating the relationship between the guide block and the restriction portion with respect to the link mechanism shown in FIG. 4.
Figure 10:
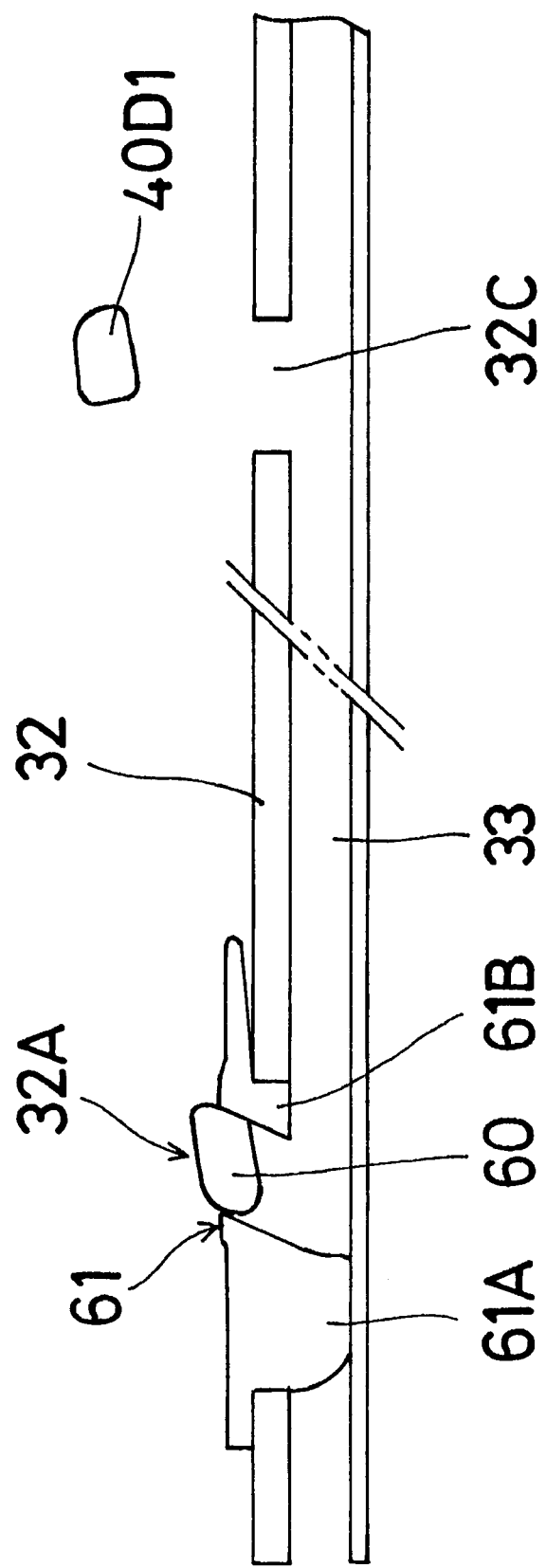
FIG. 10 is a side view of a portion of the link mechanism illustrating the relationship between the guide block and the restriction portion with respect to the link mechanism shown in FIG. 5; and, FIG. 11 is a side view of a portion of the link mechanism illustrating the relationship between the guide block and the restriction portion with respect to the link mechanism shown in FIG. 6.

FIGS. 9–11 illustrate various features associated with a checking mechanism 6, with FIG. 9 showing the condition of the checking mechanism 6 when the link mechanism 4 is positioned as shown in FIG. 4, FIG. 10 showing the condition of the checking mechanism 6 when the link mechanism 4 is positioned as shown in FIG. 5, and FIG. 11 showing the condition of the checking mechanism 6 when the link mechanism 4 is positioned as shown in FIG. 6. These drawing figures show the relative position of the guide block 6 and a restriction portion 60 of the checking mechanism 6.

The checking mechanism 6 includes the restriction portion 60 which is made of resin and fixed to the bracket 40, and the guide block 61 which is also made of resin and fixed to the recess 32A of the guide rail 3. The restriction portion 60 is formed near the engagement portion of the bracket 40 and the driven shoe 43, and extends from the side of the bracket 40 to the recess 32A side of the guide rail 3. The block 61 includes a first guide 61A provided in the recess 32A at the vehicle front side 32A1 and extending from the extension wall 32 to the bottom portion 30, and a second guide 61B provided in the recess 32A at the vehicle rear side 32A2 and having a sufficient gap with the bottom portion 30 to allow the restriction portion 60 to be slidable in the rail groove 33. The first and second guides 61A, 61B are integrally connected to each other along the side wall 31 of the rail groove 33.

The guide block 61 and the restriction portion 60 of the checking mechanism 6 are designed to allow the restriction portion 60 to be accommodated between the first and second guides 61A and 61B when the bracket 40 is positioned within the range of the first and second rotational positions (the position between FIG. 4 and FIG. 5).

The operation involving the tilting and sliding movement of the movable panel is as follows. When the movable panel 5 is moved from the covering position shown in FIG. 4 to the maximum tilting position shown in FIG. 5, the cable 10 is pushed and pulled to slide the drive shoe 42 in the rail groove 33. The rotational position of the bracket 40 at the fully closing condition is defined as the first rotational position and under this condition the restriction portion 60 fixed to the bracket 40 is engaged with the guide block 61 in the vehicle longitudinal direction and accordingly the driven shoe 43 connected to one end of the bracket 40 is not movable in the vehicle longitudinal direction.

Accordingly only the drive shoe 42 slides in the groove 33 and the link member 41 is guided in the guide grooves 40A1 and 40A2 to increase the rotational angle of the bracket 40 relative to the driven shoe 43 from the first rotational position. At the same time the movable panel 5 supported by the bracket 40 is rotated together with the bracket 40 about the engagement portion with the driven shoe 43. Thus the movable panel 5 is tilted from the fully covering position. When the rotational position of the bracket 40 reaches the second rotational position shown in FIG. 5, this represents the maximum tilting position of the movable panel 5.

When the movable panel 5 is returned from the maximum tilting position shown in FIG. 5 to the fully covering position shown in FIG. 4, the cable 10 is pushed or pulled in the reverse direction to drive the drive shoe 42 to return the link member 41 along the guide grooves 40A1 and 40A2.

The operation of the movable panel 5 from the fully covering position to the uncovering position (i.e., from the position of FIG. 4 to the position of FIG. 6) is as follows. When the cable 10 is pushed or pulled in the same direction as during the operational movement from the maximum tilting position to the fully covering position when the movable panel 5 is fully covered, the rotational angle of the bracket 40 relative to the driven shoe 43 is decreased from the first rotational position and at the same time the movable panel 5 is shifted downward. The bracket 40 is thus positioned at the third rotational position.

When the bracket 40 is positioned at the third rotational position, the restriction portion 60 fixed to the bracket 40 is released from engagement with the guide block 61 in the vehicle longitudinal direction and the bracket 40 and the driven shoe 43 are slidably guided in the rail groove 33 with the drive shoe 42. Accordingly, the movable panel 5 supported by the bracket 40 is slidably moved along the guide rail 3 to uncover the roof opening 2. At that time, the extension 40D1 is also slidably guided in the rail groove 33 via the recess 32C.

When the movable panel 5 is moved from the uncovering position shown in FIG. 6 to the covering position shown in FIG. 4, the cable 10 is pushed or pulled in the reverse direction from that carried out when the movable panel 5 is operated from the fully covering position towards the uncover condition. The bracket 40 and the driven shoe 43 are slidably guided in the rail groove 33 with the drive shoe 42 to cause engagement of the restriction portion 60 with the guide block 61. Then the extension 40D1 is moved out of the rail groove 33 via the recess 32C to prevent the bracket 40 and the driven shoe 43 from further sliding in the rail groove 33 and only the drive shoe 42 is guided in the guide grooves 40A1 and 40A2 to gradually increase the rotational angle of the bracket 40 relative to the driven shoe 43 to shift the movable panel 5 upwardly. When the rotational position of the bracket 40 reaches the first rotational position, the movable panel 5 is in the fully covered position to cover the opening 2.

The second guide groove 40A2 formed on the bracket 40 includes a portion 40A3 in which the projection 41B is located when the bracket 40 is in the third rotational position. The portion 40A3 of the second guide groove 40A2 is designed to have a smaller depth than the other portion of the second guide groove 40A2 to give a resistance force to the projection 41B when the bracket 40 is rotated from the third rotational position to the first rotational position. This will restrain the link member 41 from moving upwardly. The restriction portion 60 is prevented by this resistance of the projection 41B from moving the guide block 61 upwardly as viewed in FIG. 6.

As explained, according to the present invention, instead of using two separate members forming the checking mechanism, a single restriction portion 60 fixed to the bracket 40 is provided between the first and second guides 61A, 61B to restrict the movement of the bracket 40 in the vehicle longitudinal direction in the entire operating range from the fully covering position to the tilting operation of the movable panel 5. This construction advantageously minimizes the number of parts and reduces the cost of manufacturing.

In addition, because the restriction portion 60 fixed to the bracket 40 supporting the movable panel 5 is engaged with the guide block 61 when the movable panel is restricted in its vehicle longitudinal movement by the checking mechanism 6, looseness and rattling noise resulting from looseness between the bracket 40 and the driven shoe 43 is inhibited and substantially prevented.

Further, by simplifying the construction of the checking mechanism 6, the length of the bracket 40 from the engagement portion with the driven shoe 43 to the guide grooves 40A1 and 40A2 can be shortened. This will elongate or increase the length between the guide grooves 40A1, 40A2 and the supporting portion 40D without changing the length of the bracket 40.

Also, with this structure, sufficient space between the guide grooves 40A1, 40A2 and the supporting portion 40D can be achieved and the link member 41 engaged with the guide grooves 40A1, 40A2 can be structured to sandwich both sides of the bracket 40 by the pair of link plates 41C without any difficulty in manufacturing or assembling.

It should be noted that the restriction portion 60 is formed on the bracket 40 instead of being formed on the driven shoe 43, and substantially no looseness occurs in the movable panel 5 at the restriction of the vehicle longitudinal movement during tilting operation.

According to the present invention, when the rotational position of the bracket is in the range of the first and second rotational positions, the restriction portion of the bracket on which the movable panel is supported engages the guide block to restrict the movement of the bracket in the vehicle longitudinal direction. Accordingly, the restriction of the movement of the bracket in the vehicle longitudinal direction at both tilting and closing positions can be achieved by one member (the restriction portion of the bracket) to simplify the structure by reducing the number of parts as compared to the known construction described above.

Further, the restriction of the movable panel in the vehicle longitudinal direction at different conditions (sliding operation and tilting operation of the movable panel) can be continuously and smoothly made while not generating looseness which may occur at the operational change.

It should be noted that the features and scope of the present invention is not limited to the specific details of the embodiment described above. For example, the number of guide grooves is not necessarily limited to the two portions, and the guide rail and rain channel may be separately formed.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle sun-roof device comprising:

a movable panel for covering and uncovering an opening in a roof of the vehicle;

a guide rail provided along a side of the opening in the vehicle longitudinal direction;

a link mechanism operatively associated with the movable panel for producing tilting movement of the movable panel, the link mechanism including a bracket supporting the movable panel, a link member disposed between the bracket and the guide rail for restricting a rotational position of the bracket, a drive shoe slidably disposed in the guide rail and operatively associated with the bracket via the link member, and a driven shoe slidably disposed in the guide rail and rotatably supporting one end of the bracket, the link mechanism including the bracket having a first plate rotatably associated with the driven shoe and a pair of second plates each provided on a respective side of the first plate, a first guide groove formed in the bracket to penetrate through the first and second plates, and a second guide groove having a different locus with respect to the first guide groove and provided on the pair of second plates, and wherein the link member has a pin penetrating through the first guide groove and rotatable therewith and a pair of link plates having a projection accommodated in the second guide groove and supporting the pin from outside of the second plates, the pair of link plates being associated with the drive shoe for relative rotation therewith; and a checking mechanism for restricting movement of the driven shoe in the vehicle longitudinal direction, the checking mechanism including a restriction portion formed at the bracket and a guide block fixed to the guide rail so that when the rotational position of the bracket is within a range between a first rotational position at which the opening is fully covered by the movable panel and a second rotational position at which the movable panel is tilted at a maximum angle, the restriction portion and the guide block continue to be engaged in the vehicle longitudinal direction, and when the bracket is positioned in a third rotational position at which the movable panel is shifted downwardly relative to the maximum angle, the restriction portion is released from the guide block.

2. The vehicle sun-roof device according to claim 1, wherein the guide rail includes a rail groove formed by a bottom portion extending in a sliding direction of the drive shoe and the driven shoe, a side wall vertically extending from the bottom portion, and an extension wall extending from the side wall in parallel with the bottom portion, the extension wall being provided with a plurality of openings, and wherein the guide block includes a first guide portion provided in one of the openings of the extension wall at a vehicle front side and extending from the extension wall towards the bottom portion, and a second guide portion provided in the one opening at a rear side of the first guide portion, the second guide portion defining a space between the second guide portion and the bottom portion to allow the restriction portion to slide in the rail groove, and the restriction portion being positioned between the first and second guide portions when the rotational position of the bracket is within the range between the first and second rotational positions.

3. A vehicle sun-roof device comprising:

a movable panel for covering and uncovering an opening in a roof of the vehicle;

a guide rail provided along a side of the opening in the vehicle longitudinal direction;

a link mechanism operatively associated with the movable panel for producing tilting movement of the movable panel, the link mechanism including a bracket supporting the movable panel, a link member disposed between the bracket and the guide rail for restricting a rotational position of the bracket, a drive shoe slidably disposed in the guide rail and operatively associated with the bracket via the link member, and a driven shoe slidably disposed in the guide rail and rotatably supporting one end of the bracket, the link mechanism including the bracket having a first plate rotatably associated with the driven shoe and a pair of second plates each provided on a respective side of the first plate, a first guide groove formed in the bracket and penetrating through the first and second plates, and a second guide groove having a different locus with respect to the first guide groove and provided on the pair of second plates, the link member including a pin penetrating through the first guide groove and rotatable therewith, and a pair of link plates having a projection accommodated in the second guide groove and supporting the pin from outside of the second plates, the pair of link plates being associated with the drive shoe for relative rotation therewith; and a checking mechanism for restricting movement of the driven shoe in the vehicle longitudinal direction, the checking mechanism including a restriction portion formed at the bracket and a guide block fixed to the guide rail so that when the rotational position of the bracket is within a range between a first rotational position at which the opening is fully covered by the movable panel and a second rotational position at which the movable panel is tilted at a maximum angle, the restriction portion and the guide block continue to be engaged in the vehicle longitudinal direction.

4. A vehicle sun-roof device comprising:

a movable panel for covering and uncovering an opening in a roof of the vehicle;

a guide rail provided along a side of the opening in the vehicle longitudinal direction;

a link mechanism operatively associated with the movable panel for moving the movable panel between a first position in which the movable panel fully covers the opening in the roof and a second position in which the movable panel is tilted upwardly, and between the first position and a third position in which the movable panel is moved to uncover the opening in the roof, the link mechanism including a bracket supporting the movable panel, a link member disposed between the bracket and a drive shoe slidably disposed in the guide rail, and a slidable driven shoe rotatably supporting one end of the bracket, the bracket of the link mechanism including a first plate rotatably associated with the driven shoe and a pair of second plates each provided on a respective side of the first plate, a first guide groove passing through the first and second plates, and a second guide groove having a different locus with respect to the first guide groove and provided on the pair of second plates, the link member including a pin penetrating through the first guide groove and a pair of link plates having a projection accommodated in the second guide groove, the pair of link plates being operatively associated with the drive shoe; and a checking mechanism for restricting movement of the driven shoe in the vehicle longitudinal direction, the checking mechanism including a guide block fixed to the guide rail and a restriction portion provided on the bracket which engages the guide block when the movable panel moves from the first position to the second position and which becomes disengaged from the guide block when the movable panel moves from the first position to the third position.

5. The vehicle sun-roof device according to claim 4, wherein the guide rail includes a rail groove formed by a bottom portion, a side wall vertically extending from the bottom portion, and an extension wall extending from the side wall in parallel with the bottom portion.

6. The vehicle sun-roof device according to claim 5, wherein the extension wall is provided with a plurality of openings, and wherein the guide block includes a first guide portion provided in one of the openings of the extension wall at a vehicle front side and extending from the extension wall towards the bottom portion, and a second guide portion provided in the one opening at a rear side of the first guide portion, the second guide portion defining a space between the second guide portion and the bottom portion to allow the restriction portion to slide in the rail groove.

* * * * *